July 4, 1961
R. E. BARNABY
2,990,718
MOUNTING FOR GYROSCOPE ROTORS
Filed Oct. 13, 1959
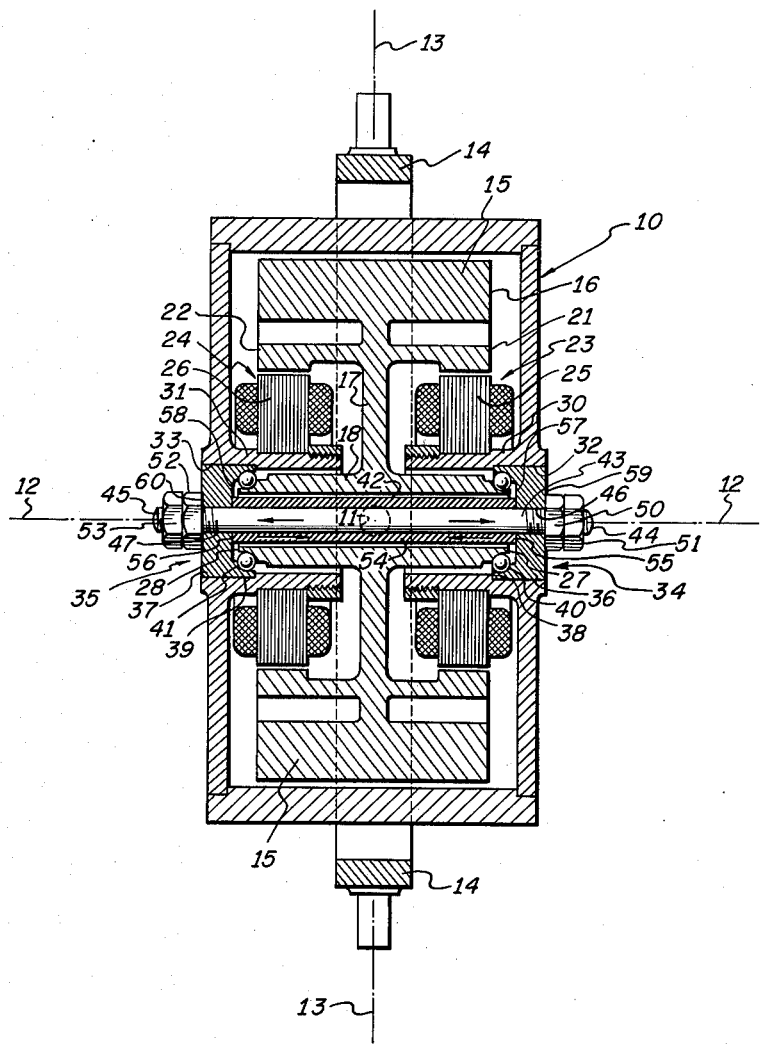
INVENTOR
ROLAND E. BARNABY
BY
ATTORNEY United States Patent Office 2,990,718
Patented July 4, 1961

2,990,718
MOUNTING FOR GYROSCOPE ROTORS
Roland E. Barnaby, Garden City, N.Y., assignor to Sperry Rand Corporation, a corporation of Delaware
Filed Oct. 13, 1959, Ser. No. 846,103
6 Claims. (Cl. 74—5)

This invention relates to mountings for rotating shafts and particularly relates to precision mountings for high speed rotating shafts such as for gyroscope rotors.

In modern gyroscopes utilizing high speed rotors, it is extremely important to provide a predetermined loading to each of the rotor bearing assemblies which is equal and remains constant under varying temperature conditions in order that the inertial characteristics of the gyroscope remain constant. In operation, gyroscopes are subjected to wide variations in ambient temperature. These variations have heretofore caused the rotor shaft and the rotor mounting structure to expand or contract differenentially resulting in uneven loading and friction of the bearing assemblies. This caused variations in the operating characteristics of the gyroscope which were aggravated when the planes of rotation of the bearing assemblies were not maintained parallel to each other.

It is a primary object of the present invention to provide a mounting for rotatable shafts that maintains a constant, uniformly distributed load on the bearing assemblies supporting the shaft in spite of wide temperature variations.

It is an additional object of the present invention to provide a rugged temperature compensated rotor mounting for high speed gyroscopes that substantially eliminates the undesirable effects due to distortion of the gyroscope frame.

It is a further object of the present invention to provide a high speed precision gyroscope that is simple to manufacture which maintains its accuracy under wide temperature variations and can be adjusted for bearing preload during operation.

These and other objects are attained by journalling the ends of an axially hollow shaft of, for example, a gyroscope rotor in a pair of axially spaced relatively movable coaxial bearing members mounted in the gyroscope frame. Tension and compression struts for providing a predetermined constant loading to the bearing members extend through and are coaxial with the hollow shaft. The extremities of the struts engage adjusting means which simultaneously varies the tension and compression in the tension and compression struts respectively while applying a preload to the bearing members. The preload remains constant during wide temperature variations because of the interaction of the struts and the rotor shaft which minimize the temperature-induced forces arising from the bearing supporting structure.

The present invention provides a mounting for high speed gyroscope rotors having a number of additional features which combine to contribute to a considerably more accurate gyroscope that is economical to manufacture, has a simple bearing preload adjustment means and a long operating life. The use of cooperative tension and compression struts provides a shaft mounting device that has extremely high rigidity in the axial and radial directions to support a heavy high speed rotor which substantially eliminate the effects of distortion of the gyroscope frame or casing, yet is sufficiently resilient to permit precise bearing preload adjustment and control. The combined tension and compression struts constitute a relatively long spring by comparison to the spring properties of the ball bearings and bearing race combination which may be regarded as a relatively short spring. By arranging the spring rate of the combined tension and compression struts to be considerably greater than the spring rate of the bearing members as determined by the bearing balls in contact with their associated races, the accurate adjustment and control of bearing preload may be determined by the tension-compression strut combination. In addition, the mounting structure by means of the relative spring rates of the element permits a vernier adjustment of the bearing preload.

Another feature is that the preload of the bearing members may be accomplished while the gyroscope is operating thereby permitting accurate preload adjustment without trial and error techniques. Further, the number of precision mating parts is limited, thus requiring a minimum of precision machining. This mounting structure also permits inner race rotation of the gyroscope rotor which increases bearing life expectancy.

Referring now to the drawing, which illustrates a vertical section of a gyroscopic rotor case and rotor incorporating the present invention, the gyroscope is shown enclosed in a rotor case or frame 10 which is supported for freedom about at least one other axis 11 other than the spin axis 12 of the gyroscope. If the gyroscope is of the free or universal axis type, a second axis of freedom 13 is provided for the gimbal ring 14 which pivotally supports the frame 10 on the axis 11. The gyroscope includes a rotor 15 which for purposes of example is shown as a homogeneous mass having a heavy outer rim 16 connected by a web 17 with the hollow rotor shaft 18. The rim 16 includes undercut portions 21 and 22 which concentrate magnetic flux to form the driven portion of two polyphase A.C. motors 23 and 24, respectively, as more fully described in Patent No. 2,857,534 to L. F. Beach, issued October 21, 1958, entitled Combination Electric Motor and Gyroscopic Structures. The stator portions 25 and 26 of each of the A.C. motors 23 and 24 are mounted on spaced projections 30 and 31 respectively. The projections 30 and 31 each extend inwardly from the frame 10 beyond the rotor shaft 18. The projections 30 and 31 are hollow providing circular bores 32 and 33 respectively therethrough that are coaxial with axis 12.

The rotor 15 is rotatably supported to spin about axis 12 by means of a pair of axially spaced bearing members 34 and 35 that are coaxial with axis 12. The bearing members 34 and 35 are mounted on the frame 10 within the circular bores 32 and 33 respectively. The ends of the rotor shaft 18 are journalled to provide inner bearing races 27 and 28 that cooperate with bearing balls 40 and 41 respectively to permit high speed rotation of the rotor 15. The outer bearing races 38 and 39 of bearing members 34 and 35 are formed in cylindrical bearing race and abutment elements 36 and 37 respectively. The cylindrical elements 36 and 37 are mounted within the circular bores 32 and 33 respectively by means of a shrink fit, threaded connection or other suitable connecting means and they are coaxial with axis 12.

To provide for the temperature compensated shaft mounting of the present invention, the rotor shaft 18 has an axial opening 42 through which coaxial tension and compression struts 43 and 54 respectively extend. The solid cylindrical tension strut 43 is disposed within the tubular compression strut 54 coaxial with axis 12. The extremities 44 and 45 of the tension strut 43 extend through centrally located apertures 46 and 47 in the elements 36 and 37 respectively. The extremity 44 of the strut 43 is threaded to receive an adjusting nut 50 and lock nut 51 while the extremity 45 is threaded to receive an adjusting nut 52 and lock nut 53.

The tubular compression strut 54 is coaxial with axis 12 and its extremities 55 and 56 abut against the recessed interior surfaces 57 and 58 of elements 36 and 37 respectively. The internal diameter of the compression strut 54 is slightly larger than the diameter of the tension strut 42 while the outside diameter of the compression strut 54 is slightly smaller than the diameter of the opening 42.

By mounting the tension and compression struts 43 and 54, respectively as disclosed, the preload on the bearing members 34 and 35 may be accurately set by tightening adjusting nuts 50 and 52 while the rotor 15 is spinning. As nuts 50 and 52 are tightened, the tension and compression struts 43 and 54 are simultaneously subjected to tensile and compressive forces respectively, while establishing a desired loading for example, two pounds, on the bearing members 34 and 35. The tensile forces in tension strut 43, as indicated by the arrows, are established by the adjusting nuts 50 and 52 abutting against the exterior surfaces 59 and 60 respectively of elements 36 and 37 while the compressive forces in the compression strut 54, also indicated by arrows, are caused by the extremities 55 and 56 abutting against the interior surfaces 57 and 58 respectively. It will be appreciated that the preload adjustment may be made during the actual operation of the gyroscope rather than as in prior art devices when the gyroscope is not operating. The prior art method requires extensive trial and error techniques to obtain the correct preload. After the adjusting nuts 50 and 52 have been tightened to set the proper preload, lock nuts 51 and 53 are tightened for locking purposes.

The rotor shaft 18 and the tension and compression struts 43 and 54 respectively are composed of materials having the same thermal coefficient of expansion. Since they are of substantially the same length they will expand and contract uniformly and equally thereby maintaining a constant preload on the bearing members 34 and 35 although subjected to wide temperature variations. Inequalities of expansion or contraction of the frame 10 will be compensated by the opposing forces established in the struts 43 and 54 since the tensile and compressive forces established in the struts 43 and 54 are considerably greater than the undesirable forces experienced by the frame 10 due primarily to temperature variations. In effect, the bearing members 34 and 35 are maintained substantially isolated from the undesirable distortions of the frame 10. Preferably, the rotor shaft 18, the tension strut 43 and the compression strut 54 as well as sleeves 36 and 37 are composed of the same material, a suitable material having been found to be high carbon chrome steel SAE 52100 having a uniform hardness of 62 on the Rockwell "C" scale.

Further, the spring rates of the struts 43 and 54 are preferably appreciably higher than the spring rates of the bearing balls 40 and 41 in contact with their respective races for example, ten times greater. This can be established by judicious selection of the compression and tension strut dimensions to establish the relative spring rates of the struts. This may be more succinctly described by considering the compression strut displacement resulting from an incremental rotation of the tension strut adjusting screw. If the areas of the compression strut 54 and tension strut 43 are equal, the resulting displacements will be substantially equal. A reduction of the tension strut area and a corresponding increase in the compression strut area will effect a reduction of the compression strut displacement due to the relation of the cross sectional areas of the struts. By this arrangement there is a minimum of distortion of the frame 10 and extraneous forces due to temperature variations are compensated in order that they have a minimum effect on the preload of the bearing members 34 and 35, thus maintaining a constant preload. This also permits a vernier adjustment of the preload since, for example, if the spring rates of the struts 43 and 54 are approximately ten times the spring rate of the bearing balls 40 and 41, an adjustment of the nuts 50 and 52 is reduced ten fold in terms of bearing loading.

It will be noted that the bearing members 34 and 35 are maintained parallel to each other by means of only four precision fits, all of which may be accomplished by simple machining operations. These concern the shrink fit between the elements 36 and 37 and frame 10 and maintaining the extremities 55 and 56 of the compression strut 54 and the interior surfaces 57 and 58 of elements 36 and 37 respectively parallel. This structure provides accurately aligned bearing assemblies that are maintained parallel to each other while the rotor is rotatably mounted on a rugged mounting structure, the components of which provide compensation for temperature variations that would otherwise cause undesirable deformation of the mounting structure.

While the invention has been described in its preferred embodiments, it is to be understood that the words which have been used are words of description rather than of limitation and that changes within the purview of the appended claims may be made without departing from the true scope and spirit of the invention in its broader aspects. For example, it will be appreciated that the bearing members 34 and 35 may be separate elements rather than integral with elements 36 and 37 respectively. In that case, elements 36 and 37 would not serve the dual function of bearing races and abutment devices but would act as abutments and to apply the preload to the separate bearing elements. However, this requires additional precision machining operations. Alternatively, the elements 36 and 37 may be integral with the frame 10 but again the machining operations become more complex. Further, the rotor shaft 18 has been described as integral with the rotor 15 but it is obvious that the rotor 15 and rotor shaft 18 may be distinct elements.

What is claimed is:

1. A temperature compensated mounting for an axially hollow shaft including a pair of axially spaced coaxial bearing members in which the ends of said shaft are journalled, a tension strut coaxial with said shaft, a compression strut coaxial with said shaft, and means cooperative with said bearing members for engaging the extremities of said struts to effectively apply a constant loading to said bearing members due to the interaction of the tensile and compressive forces in said tension and compression struts respectively whereby said loading remains constant in spite of wide temperature variations.

2. A temperature compensated mounting for gyro rotors including a frame, a pair of axially spaced coaxial bearing members mounted on said frame, a gyro rotor having a hollow shaft with ends that journal in said spaced bearing members, a tension strut coaxial with said shaft, a compression strut coaxial with said shaft, and means mounted on said frame and cooperative with said bearing members engaging the ends of said struts to maintain a constant loading on said bearing members during wide temperature variations due to the interaction of the tensile and compressive forces in said tension and compression struts respectively.

3. A temperature compensated mounting for gyro rotors including a rotor case, a pair of axially spaced bearing members mounted on said case, a rotor having a hollow shaft journalled in said spaced bearing members, a tension strut extending axially through said shaft and coaxial therewith, a compression strut extending axially through said shaft and coaxial therewith, and adjustable means cooperative with said bearing members for engaging the ends of said struts to vary simultaneously the tension and compression of said tension and compression struts respectively for maintaining a predetermined loading on said bearing members during wide temperature variations.

4. A temperature compensated gyro rotor mounting including a frame, a pair of axially adjustable spaced coaxial bearing members mounted on said frame, an axially hollow rotor shaft journalled in said spaced bearing members, a tubular compression strut located in the axial opening of said shaft and coaxial therewith, a tension strut located within the axial opening of said compression strut and coaxial therewith, said shaft and said struts being of a material having substantially the same thermal coefficient of expansion, and axially adjustable means cooperative with said bearing members for engaging said struts to vary simultaneously the tension and compression of said tension and said compression struts respectively for maintaining a predetermined constant loading on said bearing members during wide temperature variations.

5. A mounting as claimed in claim 4 in which the axially adjustable means includes a pair of elements cooperative with said bearing members through which the ends of the tension strut protrude and against which the compression strut abuts, the extremities of said tension strut being threaded and an adjusting nut mounted on each end of said tension strut and cooperative with said elements for varying simultaneously the tension and compression of said tension and compression struts respectively as said nuts are adjusted while preloading said bearing members.

6. A mounting as claimed in claim 4 wherein the spring rate of said tension and compression struts axially is appreciably greater than the spring rate of said bearing members axially.

References Cited in the file of this patent

UNITED STATES PATENTS

| | | |
|---|---|---|
| 2,042,882 | Delaval-Crow | June 2, 1936 |
| 2,857,534 | Beach | Oct. 21, 1958 |
| 2,898,765 | Atkinson et al. | Aug. 11, 1959 |